Figure 1:
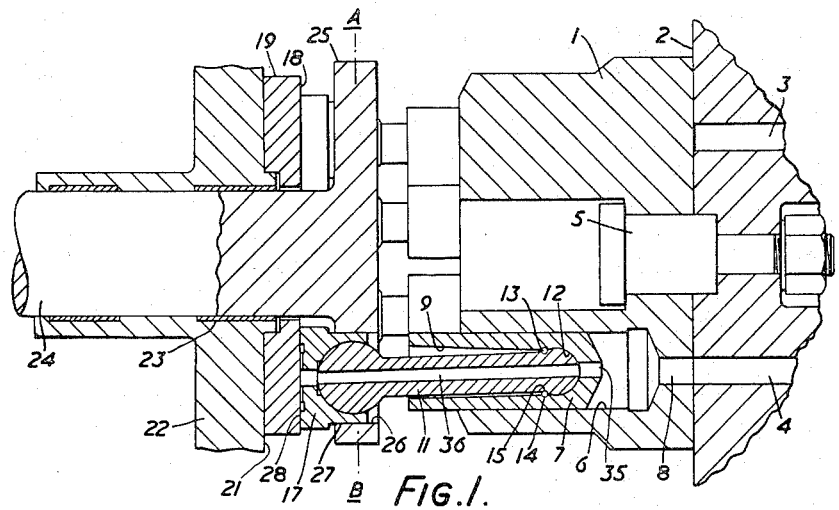

July 13, 1965  O. THOMA  3,194,173

HYDRAULIC APPARATUS

Filed Jan. 31, 1963

INVENTOR
OSWALD THOMA
BY
Reynolds & Christensen
ATTORNEYS

United States Patent Office 3,194,173
Patented July 13, 1965

3,194,173
HYDRAULIC APPARATUS
Oswald Thoma, Charlton Kings, Cheltenham, England, assignor to Dowty Hydraulic Units Limited, Ashchurch, England, a company of Great Britain, and Unipat A.G., Glarus, Switzerland, a company of Switzerland
Filed Jan. 31, 1963, Ser. No. 255,255
Claims priority, application Great Britain, Mar. 7, 1962, 8,811/62
3 Claims. (Cl. 103—162)

This invention relates to hydraulic apparatus and more particularly to hydraulically-balanced slipper bearings. A hydraulically-balanced slipper bearing is a bearing device adapted to slide over a bearing surface which may be flat or uniformly curved, and arranged to withstand considerable loading normal to the surface by virtue of high pressure liquid supplied to the slipper. Slippers of this kind are used in pumps and motors employing swash plates, track rings or the like to apply reciprocating movement to pistons in cylinders. It is usual for the hydraulic pressure in such cases to be obtained by providing a passage from the associated hydraulic cylinder to the slipper surface. The present invention is incorporated in a pump or motor of this type, and is more particularly intended to provide a slipper capable of continuous transverse movement over a flat or uniformly curved bearing surface.

It is known to provide a slipper bearing having a recess in its bearing surface which is fed with hydraulic liquid through a restrictor so that the clearance of the slipper surface from the thrust surface is determined by leakage of hydraulic liquid permitted from the recess which in turn determines the actual pressure of liquid in the recess. With such conventional slippers the restrictor is formed by a comparatively small orifice which in practise may become easily blocked by any small particle of solid matter carried round in the hydraulic liquid. If the supply of hydraulic liquid to a slipper bearing is cut off by blockage in the restrictor the result can be extremely serious in that considerable wear will take place at the slipper surface and the thrust surface, rendering the machine incorporating the slipper comparatively useless. The object of the present invention is to provide, in such mechanism, a hydraulically balanced slipper bearing having a restricted hydraulic liquid supply to a recess in the slipper bearing in which blockage of the restrictor will not completely deprive the slipper of hydraulic pressure liquid.

In accordance with the present invention a hydraulically-balanced slipper bearing for co-operation with a plane or uniformly curved bearing surface has a slipper surface adapted to engage the bearing surface, said slipper surface having inner and outer portions separated by an endless recess which, with the bearing surface, defines a pressure chamber, a hydraulic connection to the slipper and at least two restrictors extending from the hydraulic connection to the recess.

In operation when a load is supplied to the slipper and when hydraulic liquid is supplied to the connection hydraulic flow will pass principally along the restrictors to the recess where pressure is built up to lift the slipper slightly from the bearing surface and to permit leakage to take place over the outer portion of the slipper surface. Such lifting would take place to the extent that the pressure drop in the restrictors as a result of flow of leakage liquid would cause a reduced pressure to be developed in the recess which will cause a hydraulic force to be generated at the slipper surface to balance the load. The inner portion of the slipper surface may be circular and the recess and outer portion may be formed as concentric annuli about the inner portion. The restrictors may be formed by radial grooves extending across the inner portion from the hydraulic connection to the annular recess.

The grooves are less liable to blockage than is an ordinary single restrictor because of the facts that firstly there are a plurality of grooves and secondly the grooves, instead of being located in a passage leading to the recess, are closed on one side by the relatively moving bearing surface itself, which will tend to move blockage by solid particles. Further if the formation of such grooves is effected by a sawing operation the actual surfaces of the grooves will not possess transverse ridges on which solid particles could lodge as would be the case of a restricted flow passage formed in the conventional manner by drilling.

Figure 2:
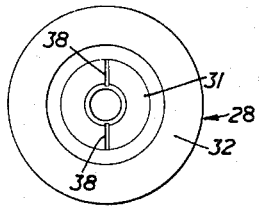
Figure 3:
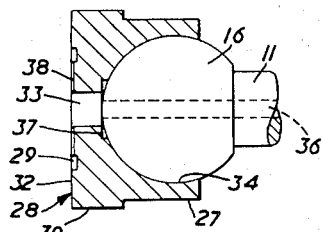

One embodiment of the invention used in a tilting head pump will now be described with reference to the accompanying drawings in which:

FIGURE 1 is a longitudinal cross-section through the pump,
FIGURE 2 is a plan view of the slipper surface of a slipper, and,
FIGURE 3 is an enlarged cross-section through a slipper.

Referring now to FIGURE 1 in the drawings the pump includes a rotary cylinder block 1 mounted on and rotatable with respect to a valve plate 2 having kidney shaped ports 3 and 4. The cylinder block is located in position on the valve plate by means of a fixed axle 5 extending from the valve plate. Within the cylinder block 1 a plurality of equally spaced cylinders 6 are formed, the axes of these cylinders being parallel to the axis of cylinder block rotation. Within each cylinder 6 a piston 7 is slidably located. Each cylinder terminates in a port 8 which co-operates alternately with the ports 3 and 4 in the valve plate during rotation of the cylinder block. Each piston 7 includes a tapered bore 9 from which extends a connecting rod 11. Each connecting rod engages its piston at a spherical surface 12 and is located within the piston by means of a circlip 13 located in grooves 14 and 15 of the piston and connecting rod respectively. This arrangement permits of slight angular movement of the connecting rod 11 within the bore 9 within the limits permitted by the bore 9. At the end of the connecting rod 11 opposite to the piston, a ball joint 16 is formed for engagement in a slipper 17. As a result of pressure within a cylinder 6 its slipper will engage the flat surface 18 of a wear plate 19. The wear plate 19 is in turn located against a flat surface 21 of a bearing housing 22. The bearing housing 22 includes bearings 23 for the pump drive shaft 24. The end of the pump drive shaft within the pump terminates at an integrally formed drive flange 25 within which are formed a plurality of equally spaced bores 26, there being one bore 26 to accommodate each slipper 17. Each slipper includes a cylindrical surface 27 machined to fit accurately within the bores 26. The axes of the bores 26 are parallel to the rotation axis of the drive shaft 24. Each slipper 17 includes a slipper surface 28 which engages against the surface 18 of the plate 19. Each surface 28 is plane and is perpendicular to the axis of the cylindrical surface 27. Also the surface 18 is plane and is perpendicular to the axis of the drive shaft 24. The slippers 17 may slide within the bores 26 so that the slipper surfaces 28 engage against the flat surface 18.

Within each slipper surface 28 an annular recess 29 is formed which divides the surface 28 into an inner annular portion 31 and an outer annular portion 32. Centrally of the annular portion 31 a hydraulic connection 33 is located which extends back into the slipper to a spherical seating 34 which accommodates the ball end 16 of connecting rod 11. A passage 35 extends through the piston 7 from the working space of cylinder 6 to the spherical seating 12 where it makes connection with an axial passage 36 extending along the connecting rod 11. The axial passage 36 opens into the surface of the ball end 16 adjacent to the hydraulic connection 33. An enlargement 37 from the connection 33 ensures that the passage 36 is not closed by the spherical seating 34 over the range of angular movement of the ball joint 16 within the slipper 17. A diametrically extending groove 38 in the inner portion 31 forms effectively a pair of radially directed grooves interconnecting the hydraulic connection 33 with the recess 29. These grooves are preferably formed by sawing or milling in such a way that tool marks within the groove extend longitudinally of the groove rather than transversely whereby to render it more difficult for solid particles to lodge in the grooves when the slipper is in use.

The pump as described in FIGURE 1 is of a known type, and includes means, not shown, whereby the cylinder block 1 and valve plate 2 are carried by supports extending toward the drive flange 25, these parts being secured by fixed pivots from the bearing housing 22 about a pivotal axis indicated at A–B in the drawing. This axis is a diameter of the circle containing the centres of the ball joints 16.

When it is desired to operate the pump the cylinder block 1 and the valve plate 2 are moved about the axis A–B to give a predetermined tilt angle between rotation axis of cylinder block 1 and the rotation axis of the drive shaft 24. Rotation of drive shaft 24 will move the slippers 17 in a circular path over the surface 18. Movement of the slippers 17 will then move the ball ends 16 causing slight tipping of the connecting rods 11 within their pistons so that one or more connecting rods will engage the bore 9 of its associated piston causing the cylinder block 1 to rotate synchronously with the drive shaft 24. Because of the inclination of the rotation axis of the cylinder block 1 to the axis of the shaft 24, rotation of drive shaft and block will cause pistons 7 to reciprocate within their cylinders. Ports 3 and 4 are arranged to connect alternately with cylinder ports 8 and a pumping action will develop between the ports 3 and 4. When a piston is descending into its cylinder it will pressurize the contained liquid and a small quantity of this liquid will flow along passages 35 and 36 to connection 33 in the slipper. From connection 33 a restricted flow of liquid will pass along the pair of grooves 38 to the annular recess 29. From the recess 29 a small flow of liquid will escape over the outer portion 32 of the surface 28. Also there will be a slight leakage over the inner portion 31 from connection 33 into the recess 29. A hydraulic force is generated between the surface 28 and the surface 18 tending to urge the slipper away from the surface 18. A position of equilibrium will be established at which the pressure drop occurring by flow of liquid through the grooves 38 following leakage of liquid over the outer portion 32 will cause a hydraulic parting force to be developed between surfaces 18 and 28 which will balance exactly the load imposed on the piston 7 by pressure of liquid in the cylinder 6 and by frictional resistance to movement of the piston within the cylinder 6. In the event that one of the grooves 38 becomes blocked by solid particles hydraulic flow through the other groove 38 is arranged to be sufficient to enable hydraulic balance to be effected although the slipper will then operate with the surface 28 slightly closer to the surface 18 in order to establish pressures for effectively balancing the load on the piston 7. Because of the fact that the surface 18 moves over the grooves 38 it will be clear that it is less likely for solid particles to lodge than if a normal restrictor were used. In the unlikely event that both of the grooves 38 become blocked by solid matter the slipper will not operate in a completely unlubricated condition because of the fact that pressure liquid has unrestricted access to the connection 33 and so to the surface 18. Although the area of the connection 33 is not sufficient to effect any substantial hydraulic balance it will feed liquid to the surface 18 and liquid will be dragged by hydrodynamic action between the surfaces 18 and 28 to effect lubrication. The normal flow of pressure liquid through the pair of grooves gives a small pressure reaction between the surfaces 18 and 28 which is symmetrical in its action on the slipper and will not tend to tip the slipper.

During operations of the pump as illustrated movement of the pistons out of the cylinders may be effected by engagement of the flange 39 of each slipper on the drive flange 25 although under such circumstances each slipper surface 28 will leave the surface 18. Normally speaking it is desirable that the surface 28 shall always remain in contact with the surface 18 and for this purpose the pump preferably receives liquid at low pressure from a priming pump at the suction port. This will always ensure that there is a hydraulic force on every piston which acts through the connecting rod 11 to urge the associated slipper on to surface 18. If it is not possible to supply liquid at low pressure to the pump, springs may be provided one within each cylinder acting to urge the piston 7 outwardly.

The conventional restrictor normally used for the supply of pressure liquid to a hydraulically balanced slipper is invariably of short length and small diameter because of the great difficulty involved in drilling a long hole of small diameter. A long hole for use as a restrictor is preferable to a short hole for the reason that a long hole can have a slightly larger diameter for a required restrictive effect. The present invention provides the equivalent of long restrictors of slightly larger cross-section by forming grooves in the bearing surface of a slipper. These grooves can be larger in cross-section than an equivalent simple restrictor of short length and, therefore, will be less likely to be obstructed by solid particles.

Whilst the invention is comparatively simple in concept it provides an hydraulically balanced slipper more reliable in use than the conventional hydraulically balanced slipper having a simple restrictor.

I claim as my invention:
1. A slipper bearing assembly comprising a wear member and a hydraulically balanced slipper movable relatively to the wear member, each having a surface for seating with slight clearance on the complemental surface of the other by generation hydraulically of the parting thrust in the leakage path between the complemental surfaces to oppose a mechanical thrust urging the slipper on to the wear plate member's surface, said slipper including a circular recess within the slipper's surface which defines with the wear member's surface a pressure chamber and divides the slipper's surface into inner and outer portions, a port opening centrally into the inner portion of the slipper's surface and adapted for connection to a source of hydraulic liquid at pressure, the radially outer portions of the complemental surfaces communicating with a low pressure region to induce outward flow through the leakage path, and at least two restrictor grooves in the inner portion of the slipper surface which, with the wear member's surface, define passages extend- ing from the port to the circular recess, the cross sectional area of each restrictor groove being considerably smaller than the cross sectional area of the circular recess whereby liquid flowing from the port through the restrictor groove to the circular recess loses pressure to establish within the circular recess a pressure lower than the pressure within the port whose value will vary inversely with the small clearance in the leakage path between the wear member's surface and the slipper's surface.

2. A hydraulically balanced slipper bearing as in claim 1, wherein the grooves are formed as a single channel the opposite ends whereof communicate with the circular recess, said channel centrally intersecting and communicating with the port.

3. A hydraulically balanced slipped bearing as in claim 1 wherein the slipper surface is circular, the circular recess is concentric with the circular slipper surface, and the port is centrally disposed within the circular surface.

References Cited by the Examiner
UNITED STATES PATENTS

| | | | |
|---|---|---|---|
| 2,679,210 | 5/54 | Muller | 103—161 |
| 2,710,234 | 6/55 | Hausen | 308—9 |
| 2,926,975 | 3/60 | Karde et al. | 92—157 |
| 2,977,891 | 4/61 | Bishop | 103—162 X |
| 2,982,218 | 5/61 | Lucien | 103—162 X |

FOREIGN PATENTS

| | | |
|---|---|---|
| 1,250,227 | 11/60 | France. |
| 1,260,243 | 3/61 | France. |
| 764,698 | 1/57 | Great Britain. |

LAURENCE V. EFNER, *Primary Examiner.*